United States Patent [19]
Hawthorne et al.

[11] Patent Number: 5,340,468
[45] Date of Patent: Aug. 23, 1994

[54] SYSTEM FOR CONTROLLING ADDITION OF LIME TO REDUCE WATER ALKALINITY

[75] Inventors: William H. Hawthorne; Gary J. Herbert, both of Thornton, Colo.

[73] Assignee: Hawthorne Treatment Systems, Inc., Thornton, Colo.

[21] Appl. No.: 40,661

[22] Filed: Mar. 31, 1993

[51] Int. Cl.$^5$ .............................................. B01D 17/12
[52] U.S. Cl. .................................... 210/96.1; 137/93; 210/198.1; 210/696; 210/709; 324/439; 364/502
[58] Field of Search ............... 210/96.1, 143, 198.1, 210/709, 739, 696, 746; 364/497, 498, 500, 502; 324/439, 442; 137/5, 93

[56] References Cited

U.S. PATENT DOCUMENTS 4,435,291  3/1984  Matsko ................................. 137/93
5,242,602  9/1993  Richardson et al. ............... 210/143

*Primary Examiner*—Joseph W. Drodge
*Attorney, Agent, or Firm*—Dorr, Carson, Sloan & Peterson

[57] ABSTRACT

A system for regulating the addition of lime to reduce water alkalinity includes two sensors for measuring the conductivity of the water prior to and after addition of lime, a pump for adding lime to the water, and a controller for regulating the pump. The controller periodically samples the conductivities measured by both sensors and computes the ratio of the conductivities for each sample as well as the slope of the ratio between samples. The controller turns the pump off when the conductivity ratio exceeds a predetermined maximum set point and the slope is positive, and turns the pump on when the conductivity ratio falls below a predetermined minimum set point and the slope is negative.

10 Claims, 5 Drawing Sheets

SYSTEM FOR CONTROLLING ADDITION OF LIME TO REDUCE WATER ALKALINITY

BACKGROUND OF THE INVENTION

1. Field of the Invention

The present invention relates generally to the field of control systems for treatment to reduce water alkalinity. More specifically, the present invention discloses a control system to regulate the addition of lime to reduce water alkalinity by continuously monitoring the conductivity of the water and its rate of change.

2. Statement of the Problem

Lime has long been used to treat water to reduce hardness or alkalinity. Lime reacts with bicarbonates and magnesium salts in the water to form insoluble calcium carbonate and magnesium salts which precipitate from solution. It has also been recognized that the conductivity of water initially progressively decreases to a minimum value with addition of lime during precipitation of bicarbonate alkalinity. After essentially complete precipitation of the bicarbonates has occurred, conductivity then begins to increase with further addition of lime. This results in a U-shaped conductivity curve as shown in FIG. 2.

Optimal control of the rate at which lime is added is important for a number of reasons. First, optimal control ensures consistent quality of the treated water. Second, it minimizes the amount of lime necessary for treatment and therefore reduces the operating costs involved. Finally, optimal control minimizes the resulting solid waste that must be disposed of.

A number of control systems have been invented in the past to regulate addition of lime or other feed materials for water treatment, including the following:

| Inventor | Patent No. | Issue Date |
| --- | --- | --- |
| Gustafson | 3,236,128 | March 1, 1966 |
| Carlson | 3,462,364 | Aug. 19, 1969 |
| King | 3,474,032 | Oct. 21, 1969 |
| Zaander, et al. | 3,605,775 | Sep. 20, 1971 |
| Lang, et al. | 4,170,553 | Oct. 9, 1979 |
| Haga, et al. | 4,282,093 | Aug. 4, 1981 |
| Campbell, et al. | 4,544,489 | Oct. 1, 1985 |
| Conlan | 4,818,412 | April 4, 1989 |
| Eberhardt | 4,882,072 | Nov. 21, 1989 |
| Loftis, et al. | 5,023,803 | June 11, 1991 |

King discloses a system for controlling lime feed to a chemical treating process wherein the conductivity of the solution varies with lime addition. In particular, the King system is based on the U-shaped conductivity curve discussed above. The King system uses a sample cell to periodically determine the minimum conductivity. A correction signal is then generated to adjust the feed setting to maintain a desired set point based upon the difference between this minimum conductivity and the current conductivity of a sample taken from the treating unit.

Carlson discloses a control system for optimizing the addition of lime for water treatment. A pacer unit determines the conductivity of water at optimal treatment. The conductivity of the water in the treating unit is also measured. The controller calculates the ratio of the conductivities of the pacer unit and the treating unit. The controller adjusts the feed rate of lime into the treating unit to maintain a predetermined conductivity ratio.

Gustarson discloses another example of control system for optimizing the addition of lime for water treatment based upon the conductivity ratio between raw water and treated water.

Zaander, et al., disclose a proportional control system for treatment processes using a variable-capacity feed pump.

The patents to Lang, et al., and Haga, et al., disclose additional examples of treatment systems that use continuous sampling of a separate stream or a pacer cell.

Campbell, et al., disclose a control process to minimize the amount of polymer added to sewage sludge for the purpose of dewatering. The controller seeks the maximum shear stress of the resulting mixture and monitors the slope of this curve to determine a peak.

Conlan discloses a system for controlling the feed rate of hypochlorite solution for removing impurities from water in a water treatment system. The oxidation/reduction potential of the effluent is continuously measured and used to control the feed rate of hypochlorite solution to maintain a predetermined oxidation/reduction potential as a set point.

Eberhardt discloses a vessel for treating bodies of water, such as lakes, to correct chemical, biological, or other imbalances in the aquatic environment. The system continuously adjusts the rate at which the treatment agent is dispensed to account for the speed of the boat and the depth of the water. The pH of the water can also be monitored.

Loftis, et al., disclose a process to control addition of sodium carbonate to precipitate calcium impurities from brine. The concentrations of calcium and carbonate ions are monitored by an automatic titration system. This data is used by a microprocessor to determine the addition rate of sodium carbonate (col. 3, line 39, et seq.).

3. Solution to the Problem

None of the prior art references uncovered in the search show a control system to regulate addition of lime for water treatment in which the feed rate is controlled by both the conductivity ratio and the rate of change of the conductivity ratio.

SUMMARY OF THE INVENTION

This invention provides a control system to regulate the addition of lime to reduce water alkalinity. The system includes two sensors that measure the conductivity of the water prior to and after addition of lime, a pump for adding lime to the water, and a controller for regulating the pump. The controller periodically samples the conductivities measured by both sensors and computes the ratio of the conductivities for each sample as well as the slope of the ratio between samples. The controller turns the pump off when the conductivity ratio exceeds a predetermined maximum set point and the slope is positive, and turns the pump on when the conductivity ratio falls below a predetermined minimum set point and the slope is negative.

A primary object of the present invention is to provide a control system to optimally control the addition of lime in treatment of water to minimize usage of lime and thereby minimize the amount of solid waste that must be disposed of.

Another object of the present invention is to provide a control system that can be readily implemented at reasonable expense using relatively few standard components.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
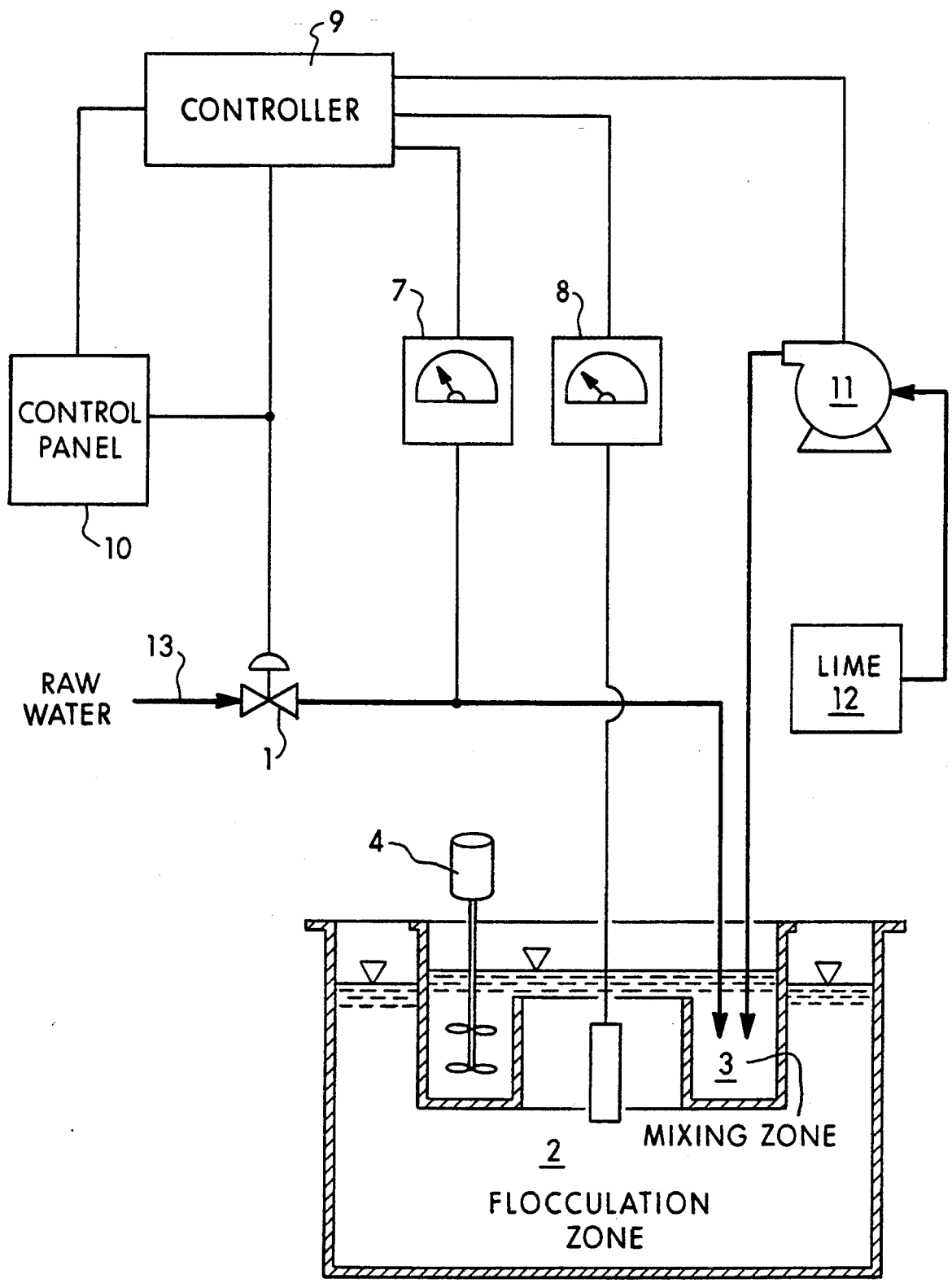
FIG. 1 is a simplified schematic diagram of present system.

Turning to FIG. 1, a schematic diagram is shown of the major components of the present invention. In general overview, untreated water flows through an inlet pipe 13 past a flow control valve 1 and enters the mixing zone 3 of the treatment vessel. The untreated water is mixed with a lime slurry in the mixing zone 3. The lime slurry is pumped from a storage tank 12 by means of a pump 11 regulated by a controller 9, such as a microprocessor. Mixing of the water and lime slurry can be enhanced by a mixer 4. After a brief residence time, the water and lime overflow the mixing zone 3 to enter into a flocculation zone 2 where the resulting insoluble salts are precipitated.

Two conductivity meters 7 and 8 monitor the conductivity of the untreated water entering the mixing zone 3 and the treated water in the flocculation zone 2, respectively. Each meter 7 and 8 generates a 4–20 ma signal proportional to the measured conductivity. These signals are sent to the controller 9 and converted to a digital value (e.g., ranging from 0 to 255). The controller 9 also receives input data and information concerning the status of the system (e.g. plant on/off) from the plant control panel 10.

Figure 2:
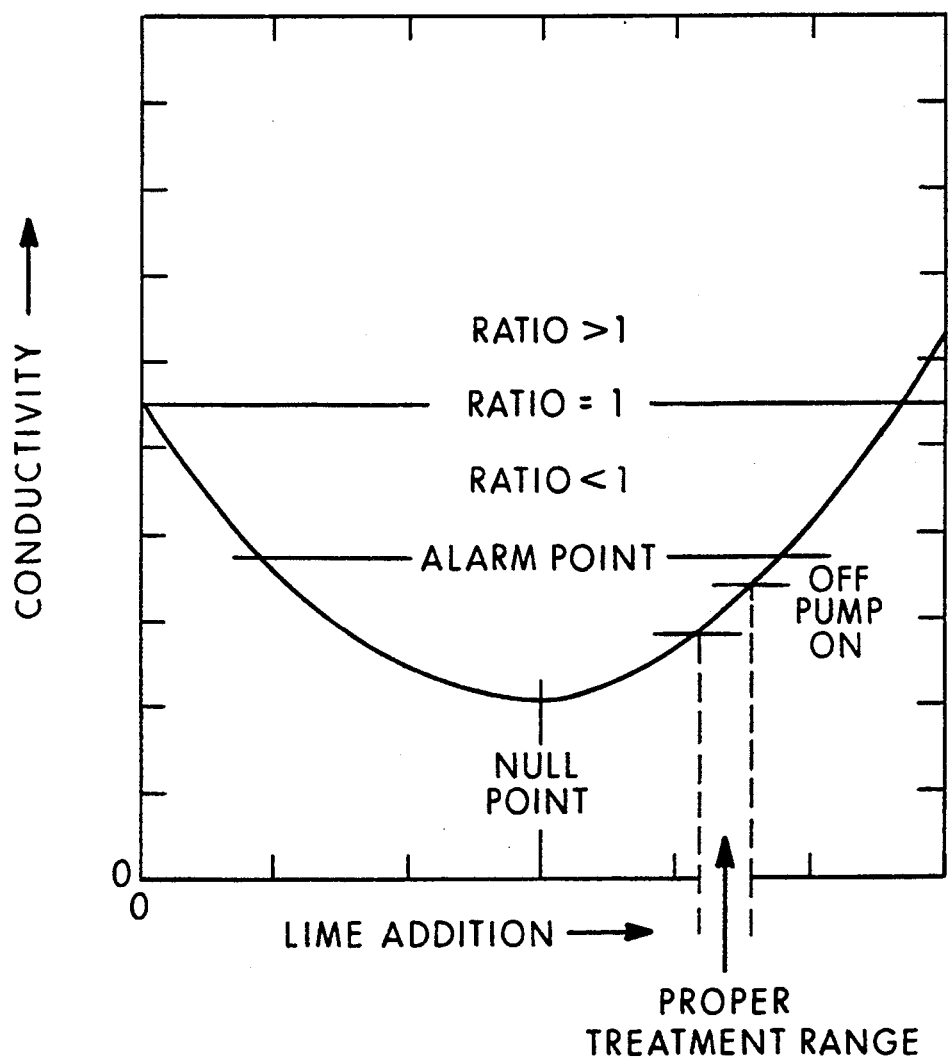
FIG. 2 is a chart demonstrating the U-shaped curve of conductivity as lime is added.

The controller 9 operates on the assumption of a U-shaped conductivity curve, as shown in FIG. 2. The controller periodically samples the conductivities measured by both sensors 7 and 8. The controller computes the ratio of the conductivities measured by both sensors as well as the rate of change of this ratio from previous samples. This rate of change of the conductivity ratio can also be referred to as the slope or the first derivative of the conductivity ratio with respect to time. The controller also determines the minimum value of the conductivity ratio (the "null point") at start up and from time to time thereafter. During normal operation, the controller insures that the system is operating on the right side of the null point on the U-shaped curve as shown in FIG. 2. In addition, controller 9 turns the pump 11 off whenever the conductivity ratio exceeds a predetermined upper set point and the slope of the conductivity ratio is positive. The controller also turns the pump 11 on whenever the conductivity ratio falls below a predetermined lower set point and the slope of the conductivity ratio is negative.

Alternatively, the controller can proportionately control the feed rate of a variable capacity pump to effectively accomplish the same result. For example, The feed rate of the pump would be reduced by the controller if the conductivity ratio exceeds the maximum set point and the slope is positive, and would be increased if the conductivity ratio falls below the minimum set point and the slope is negative.

Figure 3:
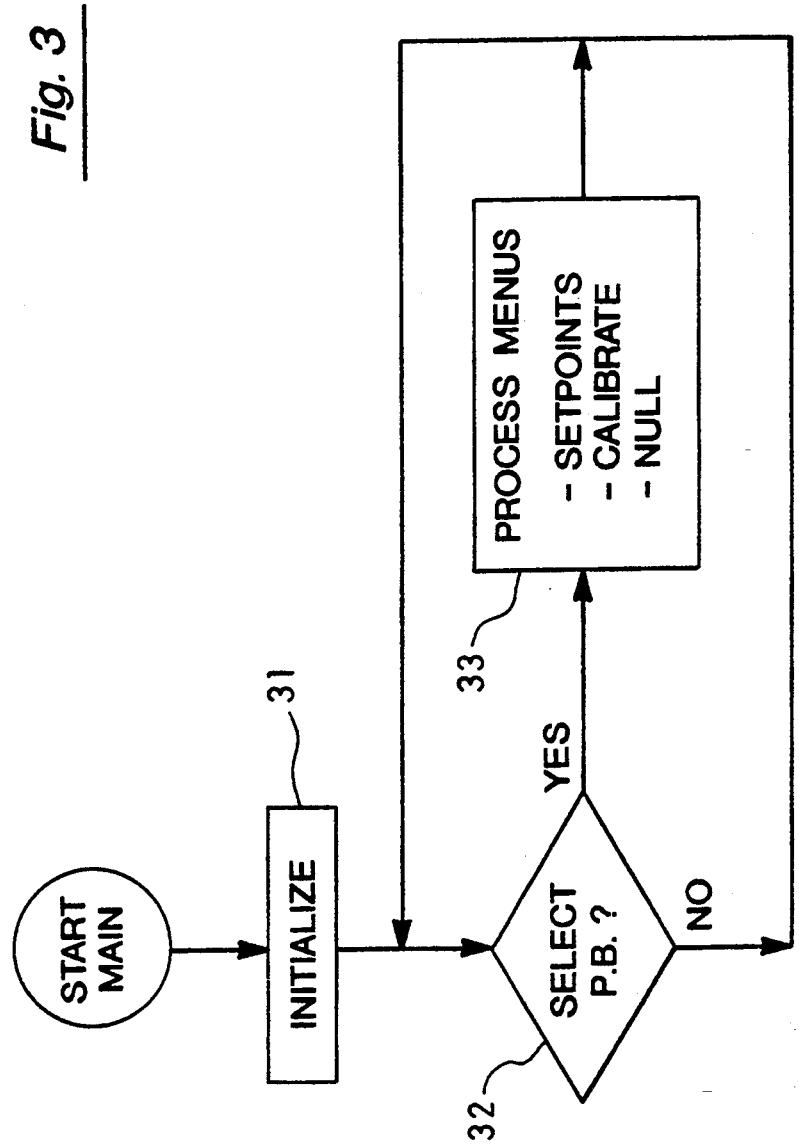
FIG. 3 is a flow chart of the main computer program which allows the user to specify set points, calibrate the conductivity sensors, or direct the system to determine the null point in the conductivity curve.

FIG. 3 provides a flow chart of the main computer program that allows the user to specify upper and lower set points, calibrate the conductivity sensors 7 and 8, or direct the controller 9 to determine the null point in the conductivity curve. For example, this main program can be implemented either as a menu screen or as a series of hot keys that can be pressed by the user to activate a desired option.

Figure 4A:
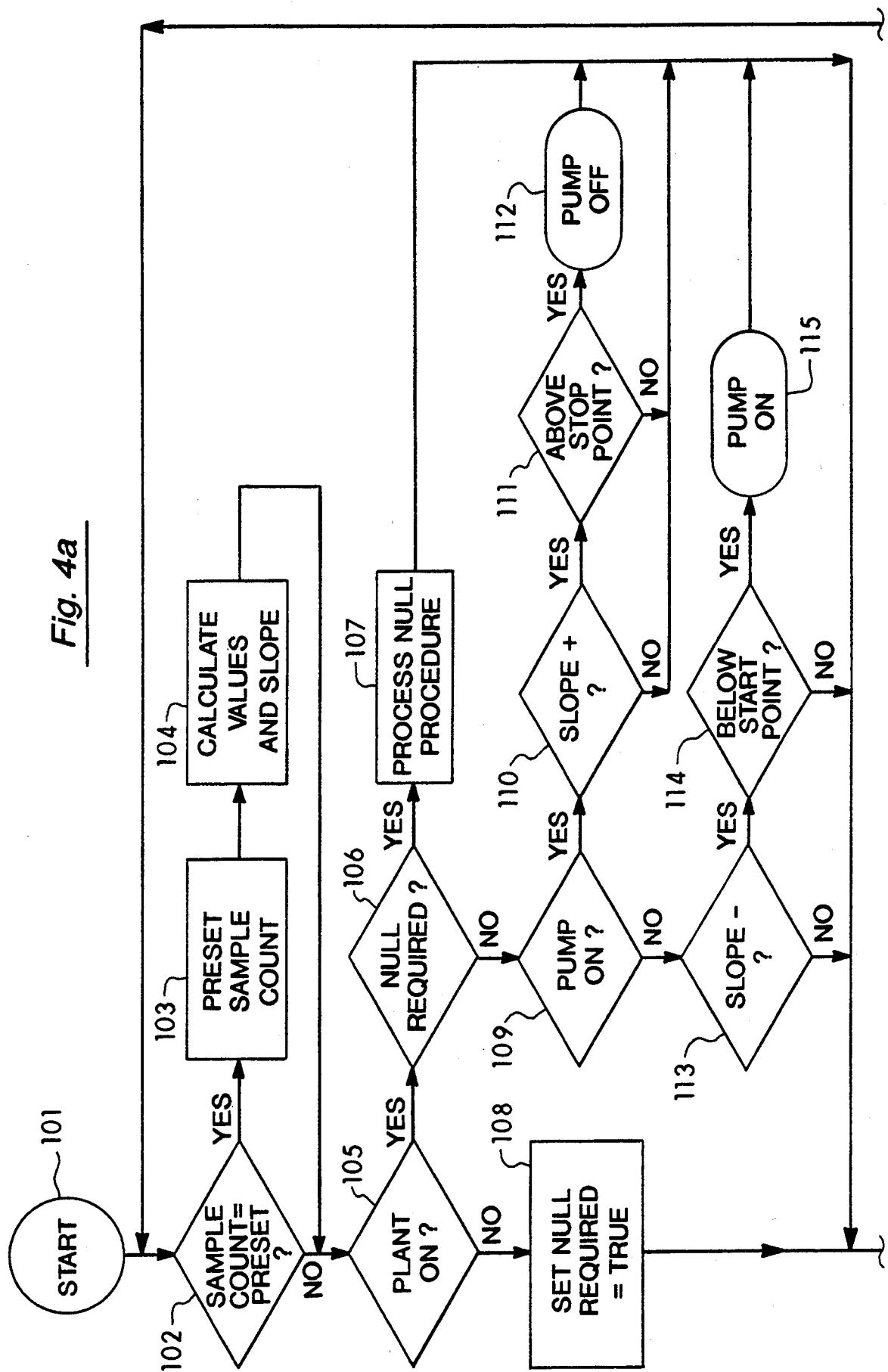
FIGS. 4a and 4b are flow charts of the computer program used to regulate addition of lime.
Figure 4B:
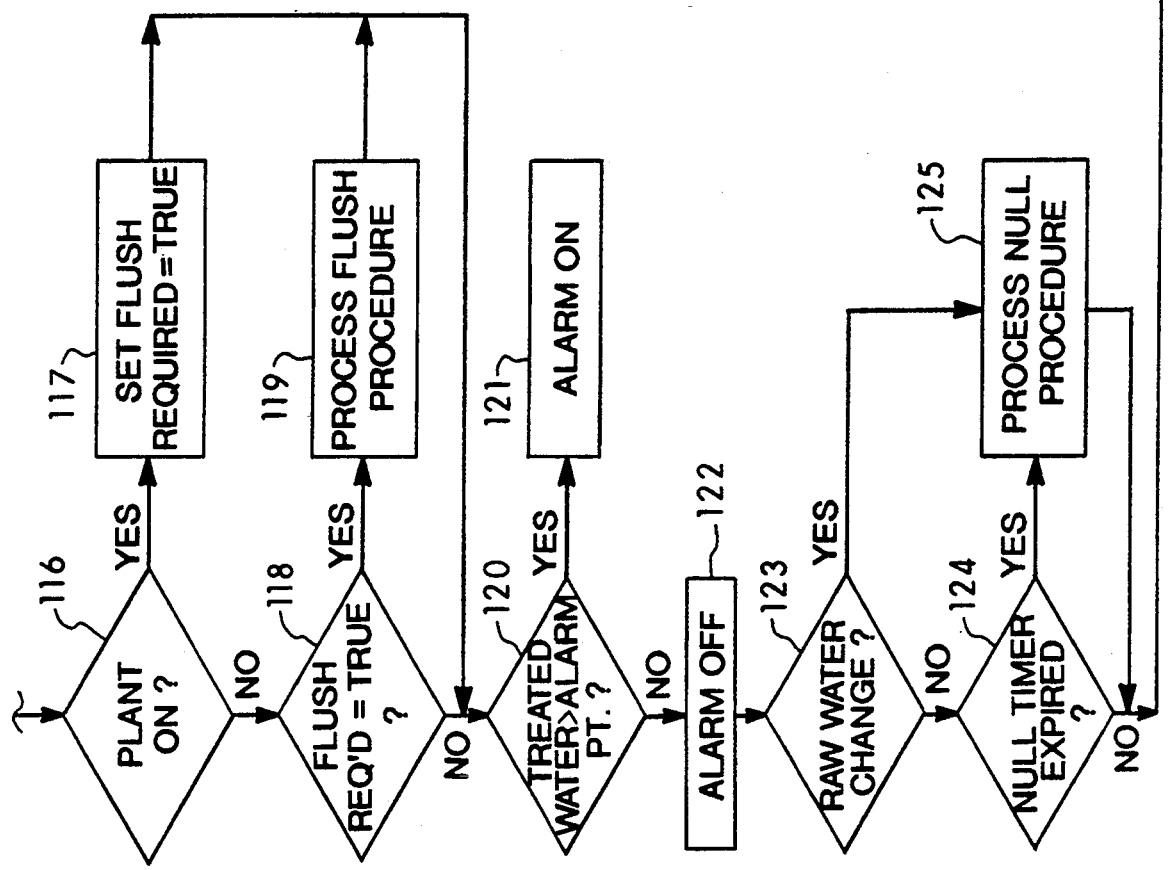

FIGS. 4a and 4b are detailed flow charts of the computer program used to regulate addition of lime during start-up and normal operation of the system. As shown in FIG. 4a, the procedure starts at step 101 with initialization of the necessary variables and proceeds to the beginning of the main processing loop at step 102. In steps 102, 103, and 104, the controller collects a preset number of samples (e.g. five) from the the conductivity sensors 7 and 8. These samples are averaged and then used to calculate the conductivity ratio and slope. In step 105, the controller 9 checks the control panel 10 to determine whether the plant is on. If not, the controller 9 sets a flag in step 108 so that the null point procedure will be executed during the first iteration after the plant is turned on. Otherwise, if the plant is on, the controller checks whether this flag has been set (step 106), indicating that the null point procedure must be executed (step 107). During start-up in the null point procedure, the control valve 1 allows untreated water to initially flow into the empty treatment vessel without addition of lime. The controller 9 then activates the pump 11 to supply lime slurry into the mixing zone of the treatment vessel for a fixed period of time. The controller 9 samples the conductivities measured by both sensors 7 and 8 during this period of time as lime is added to determine the minimum value, or null point of the conductivity ratio.

During normal operation after the first iteration in which the null point is determined, the controller 9 continues with steps 109-115 to test whether the conductivity ratio falls within the set points. In particular, the controller 9 checks whether the pump 11 is currently on (step 109). If so, the pump is turned off when the slope of the conductivity ratio is positive and the conductivity ratio is above the upper set point (steps 110, 111, and 112). Otherwise, if the pump is currently off, the controller 9 will turn the pump 11 on when the slope is negative and the conductivity ratio falls below the lower set point (steps 113, 114, and 115).

Beginning on FIG. 4b, steps 116-119 are used to flush the system after shut-down to drain the treatment vessel and ancillary equipment. A flag is set in step 117 so that the flush procedure will be executed once during the first iteration after the plant is turned off.

Steps 120-122 provide a visual or audible alarm signal to the operator when the conductivity of the treated water falls outside of predetermined acceptable limits.

Steps 123-124 determine when it is necessary to repeat the null point procedure described above. This is triggered by either of two situations in the preferred embodiment of the present invention. First, a substantial change in the conductivity of the untreated water normally dictates a need to recalculate the null point and adjust the set points. For example in the preferred embodiment, a 10% change in the conductivity of the untreated water causes the controller to re-execute the null point procedure (steps 123 and 125). Second, the null point procedure should be re-executed at periodic intervals (steps 124 and 125) to correct minor long-term drift.

The above disclosure sets forth a number of embodiments of the present invention. Other arrangements or embodiments, not precisely set forth, could be practiced under the teachings of the present invention and as set forth in the following claims.

We claim:

1. A system adapted for regulating the addition of lime to reduce water alkalinity comprising:
   a first sensor operable for measuring the conductivity of said water prior to addition of said lime;
   a second sensor operable for measuring the conductivity of said water after addition of said lime;
   pump means for adding said lime to said water; and
   a controller operable for regulating said pump means by periodically sampling said conductivities measured by said first sensor and said second sensor, computing the ratio of said conductivities for each sample, and computing the slope of said ratio; said controller further being operable for turning said pump means off when said ratio exceeds a predetermined maximum set point and said slope is positive, and turning said pump means on when said ratio falls below a predetermined minimum set point and said slope is negative.

2. The system of claim 1 wherein said controller further determines the minimum value of said conductivity ratio and regulates said pump means so that sufficient lime is added to said water to pass through said minimum conductivity ratio.

3. The system of claim 1, further comprising a treatment vessel having:
   a mixing zone in which a stream of untreated water is mixed with said lime supplied by said pump means; and
   a flocculation zone that receives said mixture of water and lime from said mixing zone and allows precipitation of the resulting insoluble salts.

4. The system of claim 3, wherein said first sensor measures the conductivity of said untreated water entering said mixing zone, and wherein said second sensor measures the conductivity of said water in said flocculation zone.

5. A system adapted for regulating the addition of lime to reduce alkalinity of a stream of water comprising:
   means for determining the ratio of the conductivity of said stream of water prior to addition of said lime to the conductivity of said stream of water after addition of said lime;
   means for determining the slope of said conductivity ratio;
   means for determining the minimum conductivity ratio of said stream of water during addition of said lime;
   pump means for adding said lime to said stream of water; and
   control means for regulating said pump means to add sufficient lime so that said stream of water passes through said minimum conductivity ratio; said control means further being operable for regulating said pump means to reduce the rate of addition of lime when said conductivity ratio exceeds a predetermined maximum set point and said slope is positive, and to increase the rate of addition of lime when said conductivity ratio falls below a predetermined minimum set point and said slope is negative.

6. The system of claim 5, wherein said pump means is a variable capacity pump and said control means proportionally controls the output of said pump.

7. The system of claim 5, wherein said control means turns said pump means off when said conductivity ratio exceeds a predetermined maximum set point and said slope is positive, and turn said pump on when said conductivity ratio falls below a predetermined minimum set point and said slope is negative.

8. The system of claim 5, further comprising a treatment vessel having:
   a mixing zone wherein a stream of untreated water is mixed with lime supplied by said pump means; and
   a flocculation zone that receives said mixture of water and lime from said mixing zone and allows precipitation of the resulting insoluble salts.

9. The system of claim 8, wherein said means for determining said conductivity ratio comprises:
   a first sensor for measuring the conductivity of said untreated water entering said mixing zone; and
   a second sensor for measuring the conductivity of said water in said flocculation zone.

10. A system adapted for regulating the addition of lime to reduce water alkalinity comprising:
    a treatment vessel having:
    (1) a mixing zone wherein a stream of untreated water is mixed with lime; and
    (2) a flocculation zone that receives said mixture of water and lime from said mixing zone and allows precipitation of the resulting insoluble salts
    a first sensor operable for measuring the conductivity of said stream of untreated water entering said mixing zone;
    a second sensor operable for measuring the conductivity of said water in said flocculation zone;
    pump means for adding said lime to said untreated water in said mixing zone; and
    a controller operable for regulating said pump means by periodically sampling said conductivities measured by said first sensor and said second sensor, computing the ratio of said conductivities for each sample, computing the slope of said conductivity ratio, and determining the minimum value of said conductivity ratio; said controller being operable for regulating said pump means so that sufficient lime is added to said water to pass through said minimum conductivity ratio, and further turning said pump means off when said ratio exceeds a predetermined maximum set point and said slope is positive and turning said pump means on when said ratio falls below a predetermined minimum set point and said slope is negative.

* * * * *